United States Patent
Arkhipenkov et al.

(10) Patent No.: US 8,614,960 B2
(45) Date of Patent: Dec. 24, 2013

(54) METHOD AND APPARATUS FOR TRANSMITTING AND RECEIVING DATA BY USING TIME SLICING

(75) Inventors: Vladimir Arkhipenkov, Suwon-si (KR); Joon-soo Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 790 days.

(21) Appl. No.: 12/465,723

(22) Filed: May 14, 2009

(65) Prior Publication Data

US 2009/0285239 A1    Nov. 19, 2009

Related U.S. Application Data

(60) Provisional application No. 61/053,084, filed on May 14, 2008.

(30) Foreign Application Priority Data

Dec. 19, 2008    (KR) .................. 10-2008-0130378

(51) Int. Cl.
*H04L 12/28*    (2006.01)
(52) U.S. Cl.
USPC ........................................................ 370/252

(58) Field of Classification Search
None
See application file for complete search history.

(56) References Cited

U.S. PATENT DOCUMENTS

| | | | |
|---|---|---|---|
| 7,130,313 B2 | 10/2006 | Pekonen | |
| 8,019,611 B2 * | 9/2011 | Oh et al. | 704/500 |
| 2008/0205529 A1 * | 8/2008 | Hannuksela et al. | 375/240.26 |
| 2009/0222855 A1 * | 9/2009 | Vare et al. | 725/39 |

OTHER PUBLICATIONS

"Digital Video Broadcasting (DVB); DVB-H Implementation Guidelines," ETSI TR 102 377, V1.2.1 (Nov. 2005), European Telecommunications Standards Institute, Sophia Antipolis Cedex, France, copyright 2005, pp. 1-104.

* cited by examiner

*Primary Examiner* — Ayaz Sheikh
*Assistant Examiner* — Blanche Wong
(74) *Attorney, Agent, or Firm* — Sughrue Mion, PLLC (57) ABSTRACT

Provided is a data transmission method using time slicing, the method includes: generating a plurality of transmission frames by realigning a plurality of pieces of data of a same layer among data of a plurality of original frames classified in a hierarchical structure based on a resolution; and transmitting the plurality of transmission frames according to a transmission order based on the hierarchical structure.

22 Claims, 8 Drawing Sheets

METHOD AND APPARATUS FOR TRANSMITTING AND RECEIVING DATA BY USING TIME SLICING

CROSS-REFERENCE TO RELATED PATENT APPLICATION

This application claims the benefit of U.S. Provisional Application No. 61/053,084, filed on May 14, 2008 in the U.S. Patent and Trademark Office, and the benefit of Korean Patent Application No. 10-2008-0130378, filed on Dec. 19, 2008 in the Korean Intellectual Property Office, the disclosures of which are incorporated herein in their entirety by reference.

BACKGROUND OF THE INVENTION

1. Field of the Invention

Methods and apparatuses consistent with the present invention relates to transmitting and receiving data by using time slicing.

2. Description of the Related Art

A method of transmitting and receiving data through a portable device that consumes less power and has a lower information processing ability than general customer electronic (CE) devices reduces power consumption of the portable device by using time slicing, divides capacity of a transmission line into predetermined time slots, and transmits a packetized broadcasting signal in the divided time slots.

SUMMARY OF THE INVENTION

The present invention provides a method of reconfiguring and transmitting data according to a hierarchical structure on a temporal axis and demodulating and restoring data of at least one layer among the transmitted data according to the hierarchical structure.

According to an aspect of the present invention, there is provided a data transmission method using time slicing, the method including: realigning a plurality of pieces of data of a same layer among data of a plurality of original frames classified as a hierarchical structure according to a resolution and generating a plurality of transmission frames; and transmitting the plurality of transmission frames corresponding to the plurality of original frames according to a transmission order based on the hierarchical structure.

The plurality of original frames may be divided into a plurality of sections including predetermined pieces of data among the data of the plurality of original frames according to the hierarchical structure based on the resolution.

The generating of the plurality of transmission frames may include: generating a plurality of data groups each including data of each data position of the plurality of sections among the plurality of pieces of data of the plurality of original frames; and generating the plurality of transmission frames in which the plurality of data groups having data positions of the plurality of sections are arranged according to the order of the data positions of the plurality of sections.

The method may further include: performing error correction coding with regard to at least one data group of at least one layer of the plurality of original frames.

The transmitting of the plurality of transmission frames may include: determining the transmission order based on the hierarchical structure and according to whether the error correction coding is performed.

The performing of the error correction coding may include: adjusting a level of the error correction coding according to the at least one layer.

The transmitting of the plurality of transmission frames may include: determining a first transmission order to continuously transmit a plurality of data groups of the same layer of each transmission frame according to the order of the plurality of transmission frames; determining a second transmission order to continuously transmit a plurality of data groups of each layer of the plurality of transmission frames according to a priority of layers of the hierarchical structure; and transmitting the plurality of transmission frames according to the first transmission order and transmitting the plurality of transmission frames according to the second transmission order.

The transmitting of the plurality of transmission frames may include: determining a third transmission order to continuously transmit a plurality of data groups of each layer of one of the plurality of transmission frames according to a priority of layers of the hierarchical structure; determining a fourth transmission order to continuously transmit a plurality of pieces of data of the plurality of transmission frames according to the order of the transmission frames; and transmitting the plurality of transmission frames according to the third transmission order and transmitting the plurality of transmission frames according to the fourth transmission order.

The method may further include: classifying the data of the plurality of original frames as the hierarchical structure based on the resolution.

According to another aspect of the present invention, there is provided a data reception method using time slicing, the method including: receiving a plurality of pieces of data arranged by time slicing according to a hierarchical structure according to a resolution; demodulating a data group of at least one layer among the received plurality of pieces of data; and combining the demodulated data and generating a plurality of output frames.

The demodulating of the data group of at least one layer may include: determining a demodulation cycle of the plurality of pieces of data based on the hierarchical structure; and demodulating a data group of at least one layer among the received plurality of pieces of data according to the determined demodulation cycle.

The determining of the demodulation cycle may include: determining the demodulation cycle as a part of a frame cycle in which the data group of the at least one layer is received, wherein the frame cycle is a cycle where one frame is received, and a plurality of frames are cyclically received according to the order of the plurality of frames.

The determining of the demodulation cycle may include: determining the demodulation cycle as a layer cycle corresponding to at least one layer among data of the plurality of frames, wherein the layer cycle is a cycle where a plurality of data groups of a layer among the data of the plurality of frames are continuously received, and a plurality of data groups of each layer are cyclically received according to the order of layers of the hierarchical structure.

The determining of the demodulation cycle may include: determining the demodulation cycle as a period in which a data group of at least one layer corresponding to a predetermined resolution is received.

The generating of the plurality of output frames may include: generating the plurality of output frames that are divided into a plurality of sections each including predetermined pieces of data; determining a plurality of data positions in the plurality of sections corresponding to the layers of the hierarchical structure; and arranging a plurality of data groups of each layer of the hierarchical structure among the demodulated data in the corresponding data positions in each section of the plurality of output frames.

Each of the plurality of output frames may include the same number of pieces of data as the number of the demodulated layers.

The method may further include: decrypting error correction coding performed with regard to at least one data group of at least one layer among the demodulated data.

The demodulating of the data group of at least one layer may include: determining the demodulation cycle of the data based on the hierarchical structure and according to whether the error correction coding is performed.

The decrypting of error correction coding may include: adjusting a level of error correction coding according to the at least one layer.

According to another aspect of the present invention, there is provided a data transmission apparatus using time slicing, the apparatus including: a transmission frame generating unit realigning a plurality of pieces of data of the same layer among data of a plurality of original frames classified as a hierarchical structure according to a resolution and generating a plurality of transmission frames; and a transmitting unit transmitting the plurality of transmission frames corresponding to the plurality of original frames according to a transmission order based on the hierarchical structure.

The apparatus may further include: an error correction coding unit performing error correction coding with regard to at least one data group of at least one layer of the plurality of original frames.

According to another aspect of the present invention, there is provided a data reception apparatus using time slicing, the apparatus including: a data receiving unit receiving a plurality of pieces of data arranged by time slicing according to a hierarchical structure according to a resolution; a demodulating unit demodulating a data group of at least one layer among the received plurality of pieces of data; and an output frame generating unit combining the demodulated data and generating a plurality of output frames.

The demodulating unit may include a demodulation cycle determining unit determining a demodulation cycle of the plurality of pieces of data based on the hierarchical structure, and demodulates at least one data group of at least one layer among the received plurality of pieces of data according to the determined demodulation cycle.

The apparatus may further include: an error correction coding decrypting unit decrypting error correction coding performed with regard to at least data group of at least one layer among the demodulated data.

The apparatus may further include: a demodulation power controlling unit controlling a voltage of the demodulating unit according to the demodulation cycle of the received data; a demultiplexer arranging data according to the hierarchical structure of the received data based on the order of the plurality of output frames and layers of the data to generate the plurality of output frames; and a buffer storing the plurality of output frames.

According to another aspect of the present invention, there is provided a method of computer readable recording medium having recorded thereon a program for executing the data transmission method using time slicing.

According to another aspect of the present invention, there is provided a method of computer readable recording medium having recorded thereon a program for executing the data reception method using time slicing.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Hereinafter, exemplary embodiments will be described in detail with reference to the attached drawings.

Figure 1:
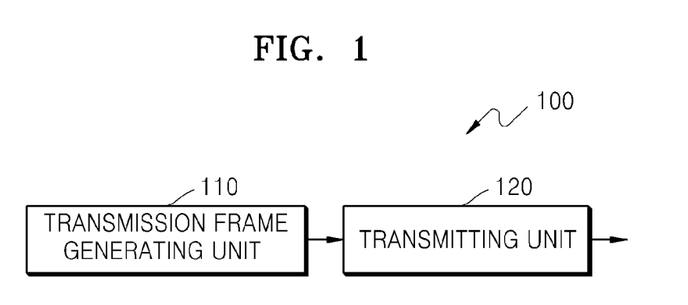
FIG. 1 is a block diagram of a data transmission apparatus according to an exemplary embodiment of the present invention.

FIG. 1 is a block diagram of a data transmission apparatus 100 according to an exemplary embodiment of the present invention. Referring to FIG. 1, the data transmission apparatus 100, which uses time slicing, includes a transmission frame generating unit 110 and a transmitting unit 120. The data transmission apparatus 100 may further include an error correction coding unit (not shown) that performs error correction coding with regard to a data group of at least one layer of a plurality of original frames. The data transmission apparatus 100 may further include a hierarchical structure classifying unit (not shown) that classifies a plurality of pieces of data of the original frames into hierarchical structures according to a resolution.

A hierarchical structure according to a resolution is a structure that is classified according to a capacity representing detailed information. Data of an original frame is divided into sections including a predetermined piece of data. In this regard, the order or position of data in each section may represent a layer corresponding to the data according to a hierarchical structure. Otherwise, the range of data including at least one piece of data in each section may represent a layer corresponding to the data according to a hierarchical structure.

The data transmission apparatus 100 transmits various types of data, such as sound, image, etc., having unlimited categories. For example, the data of the original frame, which is two-dimensional image data, may be divided into blocks.

For example, the data of the original frame may be divided into N blocks, and each block may include M pieces of data. If positions of the M pieces of data in a section correspond to layers, respectively, the position of predetermined data in a block including the M pieces of data represents a layer of the predetermined data.

The error correction coding unit (not shown) of the data transmission apparatus 100 may perform error correction coding with regard to a data group of at least one layer. The error correction coding unit (not shown) may perform error correction coding with regard to a data group for which error correction coding is determined according to a necessity for protecting the data group against a transmission error, corresponding to a predetermined layer.

Therefore, the error correction coding unit (not shown) may perform error correction coding with regard to a data group of a layer corresponding to a predetermined resolution or data groups of various layers. As another example, the error correction coding unit (not shown) may perform error correction coding with regard to data groups of all layers and may adjust a level of error correction coding according to layers of the data groups. For example, the error correction coding unit (not shown) may adjust the level of error correction coding with regard to a data group of the layer corresponding to the predetermined resolution, which requires more protection against transmission error than error correction coding performed with regard to data groups of other layers.

The transmission frame generating unit 110 realigns the plurality of pieces of data of the original frames that are classified into the hierarchical structures, according to layers, generates transmission frames in which a plurality of pieces of data of the same layer is arranged, and sends the generated transmission frames to the transmitting unit 120.

The transmission frame generating unit 110 may generate the plurality of pieces of data of the original frames as data groups having the same position in each section, and generate the transmission frames in which the data groups having the same position in each section are arranged according to the data position order in each section.

For example, the transmission frame generating unit 110 selects data having positions of the 1 through M data in each block, and generates data groups in each position of the 1 through M data. The number of data in each data group is the same as the total number of blocks in the frame. The transmission frame generating unit 110 generates the transmission frames in which the data groups of each position of the 1 through M data are arranged according to the data position order (i.e., 1, 2, . . . M).

The transmitting unit 120 transmits data of the transmission frames generated by the transmission frame generating unit 110 in which the plurality of pieces of data of the original frames are classified into the hierarchical structures and the data groups of the same layer are arranged. The original frames may correspond to the transmission frames, respectively.

In this regard, the transmission order of the transmission frames may be determined based on the hierarchical structures. If the error correction coding unit (not shown) performs error correction coding with regard to the data, the transmitting unit 120 may determine the transmission order of the transmission frames based on the hierarchical structures and according to whether the data is error corrected.

The transmitting unit 120 may determine the transmission order so as to continuously transmit the data groups of the same layer of each transmission frame according to the order of the transmission frames and to continuously transmit the data groups of each layer according to the order of layers of the hierarchical structures. In more detail, the transmitting unit 120 may determine the transmission order of the transmission frames so as to continuously transmit data groups having a first data position of all blocks of all the transmission frames according to the order of frames, to continuously transmit data groups having a second data position of all blocks of all the transmission frames according to the order of frames, and to transmit data groups of the same layer of all the transmission frames together.

In this regard, data groups of a predetermined layer are a set of data groups that include N pieces of data of a predetermined layer of 1 through M layers for each transmission frame among all frames.

The transmitting unit 120 may determine the transmission order so as to continuously transmit data groups of each layer of a first transmission frame according to the order of layers and to continuously transmit data groups of each layer of a second transmission frame according to the order of the layers. In more detail, the transmitting unit 120 may determine the transmission order so as to transmit all pieces of data of one of the transmission frames according to the order of layers and to transmit data of a next transmission frame, and to transmit a plurality of pieces of data of the same transmission frame.

Although not shown, the data transmission apparatus 100 may further include a demultiplexer that realigns the plurality of pieces of data of the original frames based on the hierarchical structures and the order of the original frames, and at least one buffer or memory as a storage unit for storing the data of the transmission frames.

Figure 2:
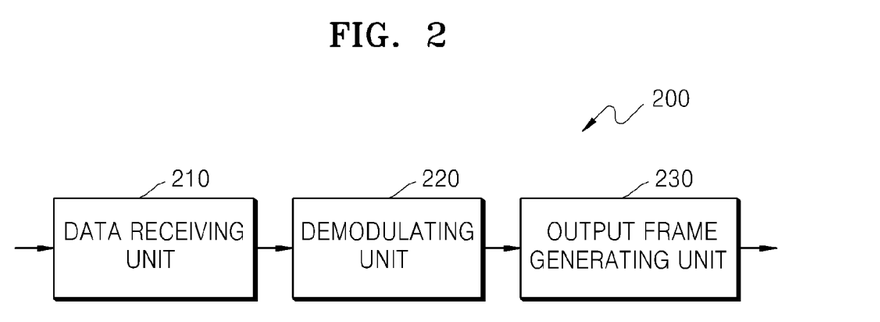
FIG. 2 is a block diagram of a data receiving apparatus according to an exemplary embodiment of the present invention.

FIG. 2 is a block diagram of a data receiving apparatus 200 according to an exemplary embodiment of the present invention. Referring to FIG. 2, the data receiving apparatus 200, which uses time slicing, includes a data receiving unit 210, a demodulating unit 220, and an output frame generating unit 230. Although not shown, the data receiving unit 200 may further include an error correction coding decrypting unit (not shown).

The data receiving unit 210 receives a plurality of pieces of data that are time sliced according to a hierarchical structure according to a resolution and sends the received data to the demodulating unit 220. With regard to the received data, a plurality of pieces of data are realigned according to the hierarchical structure.

The data receiving unit 210 may receive data of each frame in which data groups of each layer are arranged according to the hierarchical structure. The data receiving unit 210 may continuously receive data groups of the same layer of all frames according to the order of frames, and continuously receive data groups of each layer according to the order of layers. The data receiving unit 210 may continuously receive data groups of each layer of each frame according to the order of the layers, and continuously receive a plurality of pieces of data of each frame according to the order of frames.

The demodulating unit 220 demodulates a data group of at least one layer among the plurality of pieces of data received by the data receiving unit 210 and sends the demodulated data group to the output frame generating unit 230. The demodulating unit 220 may include a demodulation cycle determining unit (not shown) that determines a demodulation cycle of the data based on the hierarchical structure. The demodulating unit 220 may demodulate the data group of at least one layer among the plurality of pieces of data according to the demodulation cycle determined by the demodulation cycle determining unit (not shown). The demodulation cycle determining unit (not shown) may not be included in the demodulating unit 220 and may be included separately in the data receiving apparatus 200.

The demodulation cycle determining unit (not shown) may determine the demodulation cycle as a part of a frame cycle in which the data group of at least one layer is received. The frame cycle is a cycle in which a frame is received. A plurality of frames may be continuously and cyclically received according to the order of the frames. For example, the demodulation cycle determining unit (not shown) may determine the demodulation cycle as a part of each frame cycle in order to demodulate a data group of a layer corresponding to a predetermined resolution of each frame or to demodulate data groups of several layers corresponding to the predetermined resolution.

The demodulation cycle determining unit (not shown) may determine the demodulation cycle as a layer cycle corresponding to at least one layer among a plurality of pieces of data of frames. In this regard, the layer cycle is a cycle in which a data group of a layer is received when data groups of the same layer among the plurality of pieces of data of frames are continuously received, and data groups of each layer are continuously and cyclically received according to the order of layers.

The error correction coding decrypting unit (not shown) performs error correction coding decrypting with regard to a data group of at least one layer among the demodulated data. The error correction coding decrypting unit (not shown) may adjust a level of error correction coding decrypting that may differ according to layers of data groups. The error correction coding decrypting unit (not shown) may perform error correction coding decrypting with regard to a data group of some layers among the demodulated data.

The demodulation cycle determining unit (not shown) may select the demodulation cycle according to an operation environment, such as a channel, communication specification, etc., and adjust an amount of service received or an amount of restoration performed.

The demodulation cycle determining unit (not shown) may determine the demodulation cycle of data according to the hierarchical structure and whether error correction coding is performed with regard to the data. In view of an error correction coded area, the demodulation cycle determining unit (not shown) may determine the demodulation cycle of the data according to whether error correction coding is performed with regard to a data group as well as a layer of the data group.

The data receiving apparatus 200 may further include a demodulation power controlling unit (not shown) that controls a voltage level of the demodulating unit 220 according to the demodulation cycle determined by the demodulation cycle determining unit (not shown) in order to control the amount of data to be demodulated. The determination and control of the demodulation cycle will be described in more detailed with reference to FIGS. 3 through 5.

The output frame generating unit 230 combines the data demodulated by the demodulating unit 220, generates output frames, and outputs the generated output frames. The output frame generating unit 230 generates the output frames that are divided into sections with regard to predetermined pieces of data, and determines data positions in the sections corresponding to layers of the hierarchical structure. The output frame generating unit 230 may arrange data groups of each layer among the demodulated data in data positions corresponding to the layers of the sections of the output frames.

The sections of the output frames may be sections including the same number of data as demodulated layers. For example, if a data group of 1 through m layers is demodulated among the total M layers, since the data group includes a total number of N pieces of data of each layer, the demodulating unit 220 demodulates N×m pieces of data and sends the demodulated N×m pieces of data to the output frame generating unit 230. The output frame generating unit 230 may generate an empty output frame that is divided into N blocks that are sections including positions of the m pieces of data. The output frame generating unit 230 inserts the data groups of each layer of the demodulated data in each block of the empty output frame into data positions corresponding to layers in order to generate the output frames.

The data receiving apparatus 200 may further include a demultiplexer that realigns the output frames in which a plurality of pieces of data according to the hierarchical structure of the received data are arranged based on the order of the output frames and layers of the data, and a storage unit, such as at least one buffer or memory, for storing the output frames.

Figure 3:
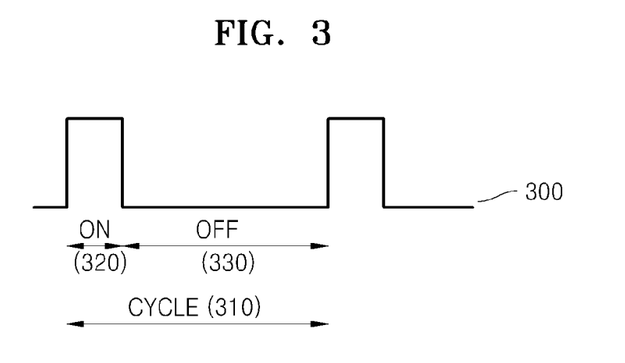
FIG. 3 is a waveform diagram of a demodulation cycle for time slicing communication.

FIG. 3 is a waveform diagram of a demodulation cycle for time slicing communication. Referring to FIG. 3, if received data is a cyclical signal and a predetermined operation is performed with regard to a predetermined section of the received data using time slicing, a voltage waveform 300 may be controlled so that a voltage is cyclically applied to an operation processor. In more detail, an ON status voltage is applied to the operation processor during a section 320 when the received data is being processed during a cycle 310 of the received data, and an OFF status voltage is applied to the operation processor during a section 330 when the received data is not being processed.

Figure 4:
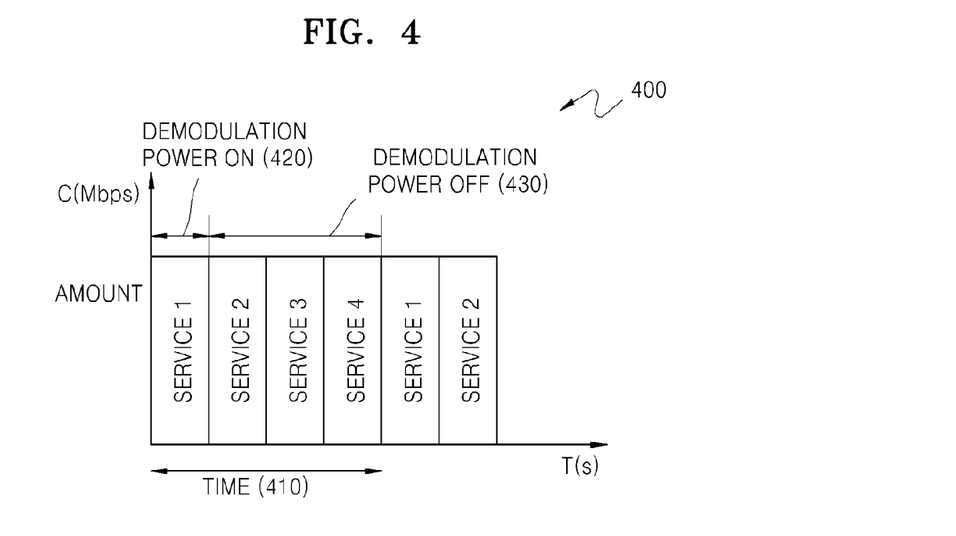
FIG. 4 is a graph illustrating a data service according to time slicing communication.

FIG. 4 is a graph illustrating a data service 400 according to time slicing communication. Referring to FIG. 4, the data service 400 is divided according to time slicing on a temporal axis and a slicing pattern is cyclically repeated. In more detail, the data service 400 is divided into data services 1 through 4 on the temporal axis, and some of the data services 1 through 4 are continuously transmitted and received in a data cycle 410. For example, if only the data service 1 is transmitted and received, an ON status voltage is applied to a demodulating unit during a section 420 of the data service 1 and an OFF status voltage is applied to the demodulating unit during a section 430 of the data services 2 through 4 in the data cycle 410.

Figure 5:
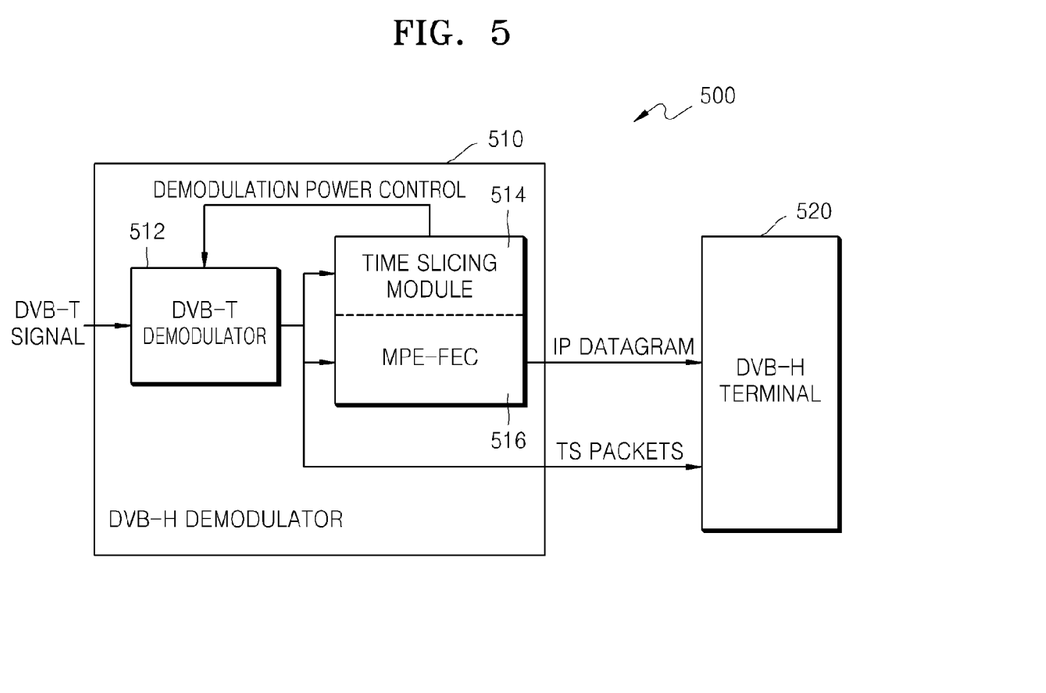
FIG. 5 is a conceptual structure diagram of a Digital Video Broadcasting-Handheld (DVB-H) receiver according to an exemplary embodiment of the present invention.

FIG. 5 is a conceptual structure diagram of a DVB-H receiver 500 according to an exemplary embodiment of the present invention. A time slicing receiving method may be applied to the DVB-H receiver. The DVB-H standard defines demodulation and time slicing according to the DVB-terrestrial (T) standard.

Referring to FIG. 5, the DVB-H receiver 500 includes a DVB-H demodulator 510 and a DVB-H terminal 520. The DVB-H demodulator 510 includes a DVB-T demodulator 512, a time slicing module 514 and a multi protocol encapsulation (MPE)-forward error correction (FEC) module 516. The time slicing module 514 reduces power consumption and the MPE-FEC module 516 improves tolerance to impulse noise.

The time slicing module 514 may control a voltage to be applied to the DVB-T demodulator 512 in a demodulation cycle of burst data. The MPE-FEC modulator 516 may transmit demodulated burst data in elementary stream (ES) types data which encapsulates each Internet Protocol (IP) datagram of the burst data into one MPE, to the DVB-H terminal 520. Transport stream (TS) packets and IP datagrams can be transmitted, by using time slicing and non-time slicing, respectively, to the DVB-H terminal 520.

The DVB-H receiver 500 controls the voltage applied to a front-end portion including the DVB-T demodulator 512 so that an ON status voltage is applied during a cycle when a dedicated service is being received and an OFF status voltage is applied during a cycle when a service which is not dedicated to demodulation is being received. Therefore, the DVB-H standard can reduce the entire power consumption of the DVB-H receiver, and is applied to a receiver having a small battery.

Hereinafter, a method of dividing and transmitting data by using time slicing will be described with reference to FIGS. 6 through 13.

Figure 6:
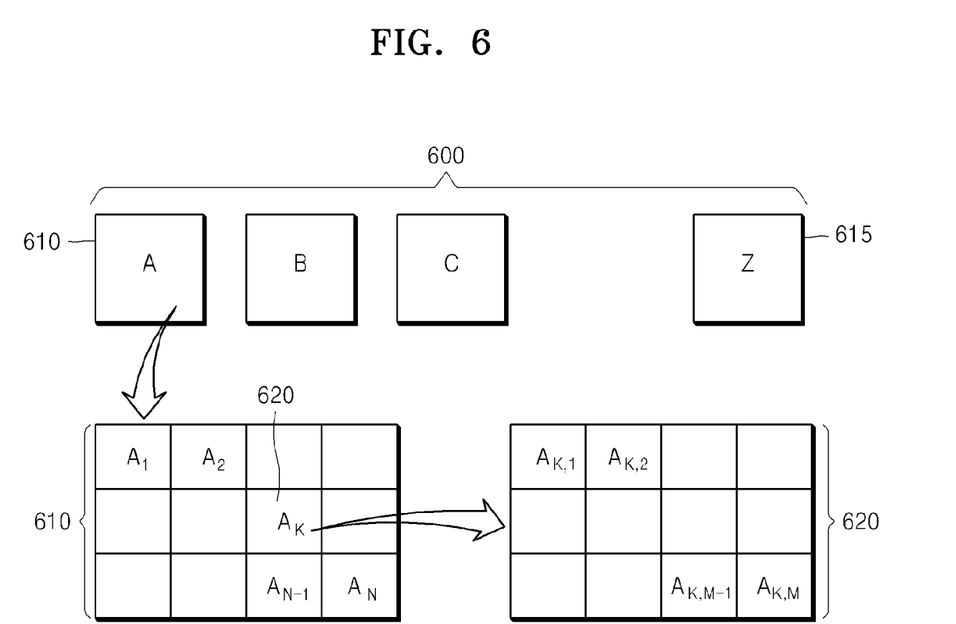
FIG. 6 is a diagram for explaining a data division method according to an exemplary embodiment of the present invention.

FIG. 6 is a diagram for explaining a data division method according to an exemplary embodiment of the present invention. For the sake of description, image data includes a plurality of frames 600 between a frame A 610 and a frame Z 615. Each frame may be divided into at least one block including at least one piece of data.

With regard to a frame structure, the frame A 610 is divided into data sections of blocks $A_1$ through $A_N$, which are N blocks in total. Each of the blocks $A_1$ through $A_N$ includes M data positions. For example, a block $A_K$ includes M data positions $A_{K,1}$ through $A_{K,M}$. In more detail, since each block includes M pieces of data, each frame may include N×M pieces of data.

In the present exemplary embodiment, blocks of each frame are used to adjust an amount of a data processing unit, and data positions in a block may correspond to layers of a hierarchical structure, respectively. The layers may be divided according to the amount of data or the importance of information of a data set including at least one piece of data in a block.

Figure 7:
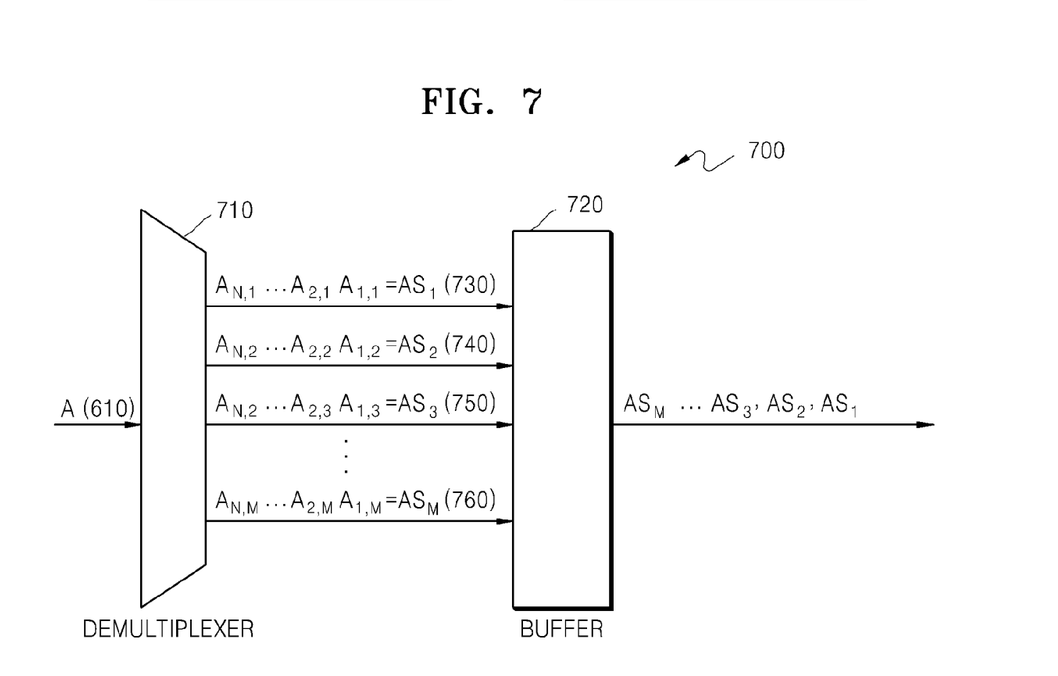
FIG. 7 is a diagram for explaining a method of transmitting a frame according to an exemplary embodiment of the present invention.
Figure 8:
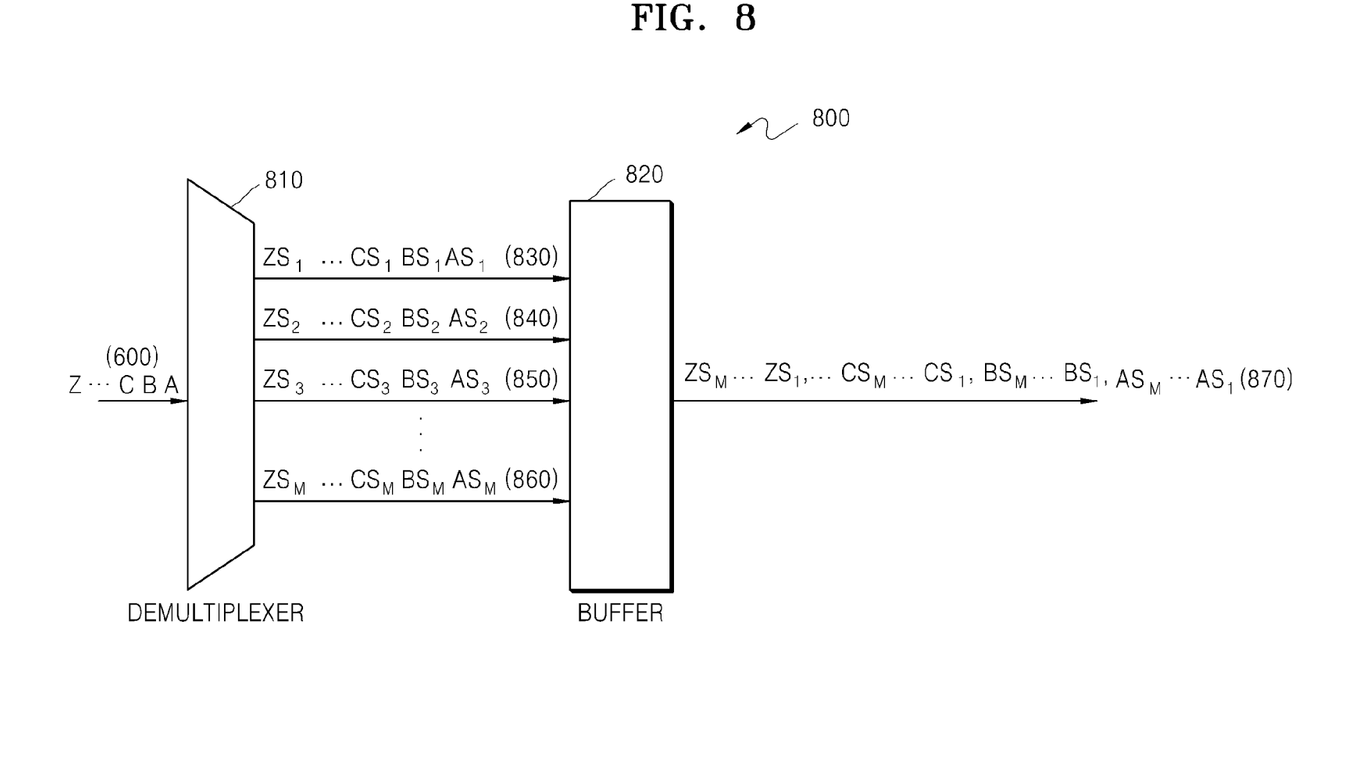
FIG. 8 is a diagram for explaining a method of transmitting a plurality of frames according to an exemplary embodiment of the present invention.
Figure 9:
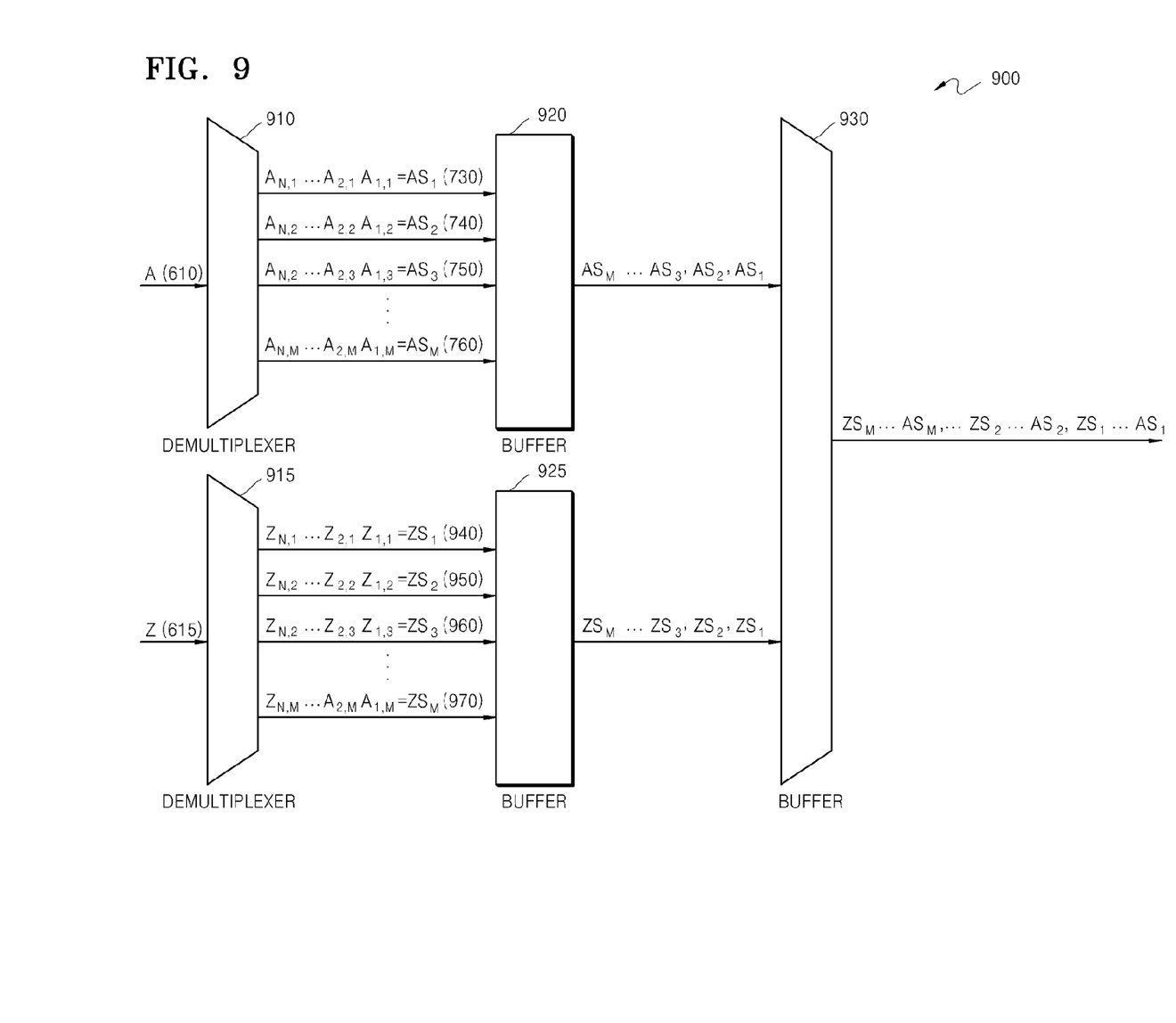
FIG. 9 is a diagram for explaining a method of transmitting a plurality of frames according to another exemplary embodiment of the present invention.
Figure 11:
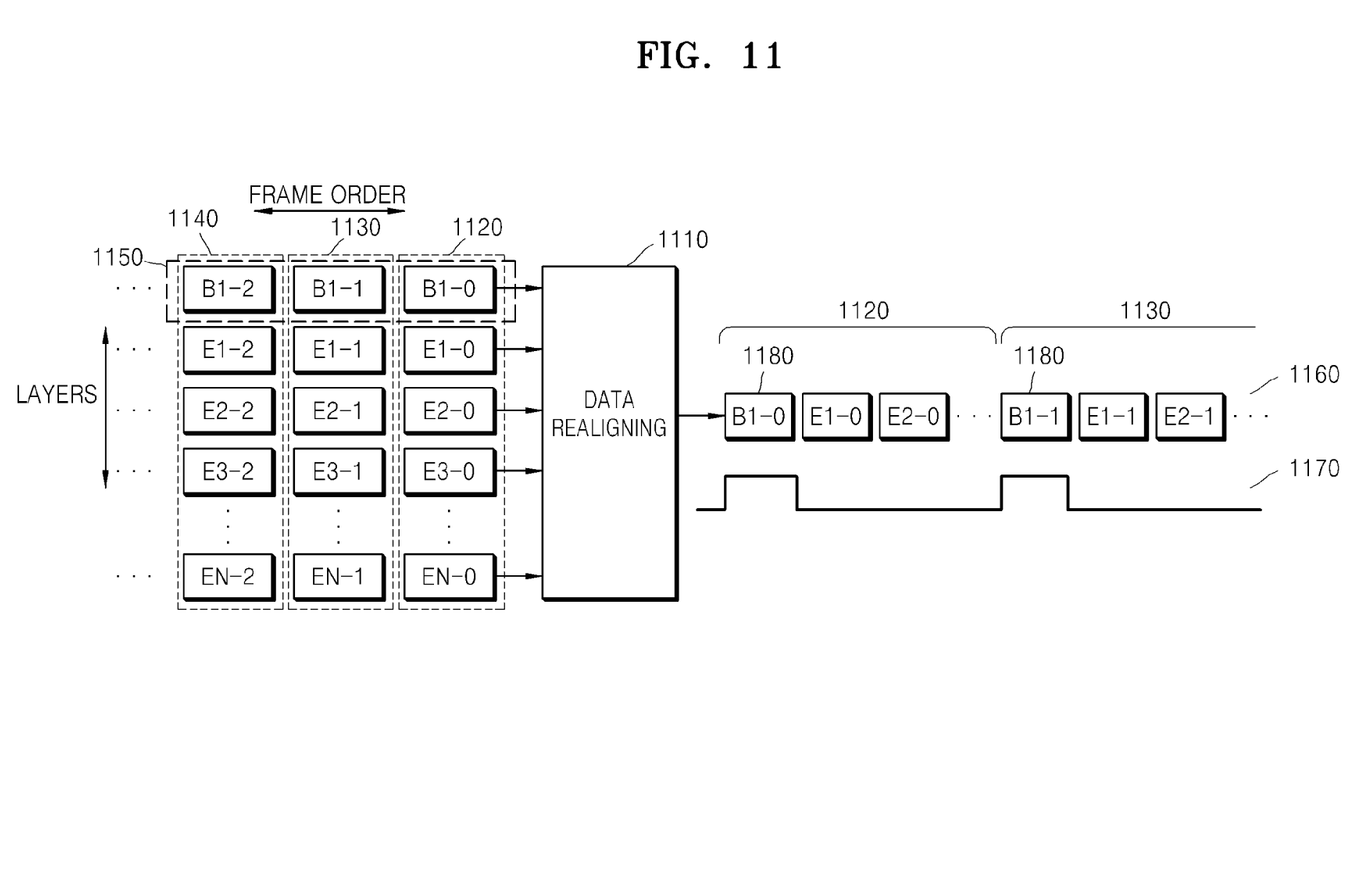
FIG. 11 is a diagram for explaining a data division and transmission method according to an exemplary embodiment of the present invention.

The layers are divided according to data positions with reference to FIGS. 7 through 9. The layers are divided according to the importance of information, as illustrated in FIG. 11.

FIG. 7 is a diagram for explaining a method of transmitting a frame according to an exemplary embodiment of the present invention. Referring to FIG. 7, a transmission frame generating unit 700 may realign the data of the original frames based on layers by using a demultiplexer 710, generate transmission frames in which the data of the same layer is arranged, and store the generated transmission frames in a buffer 720.

Data of a predetermined data position of a $1^{st}$ data position through an $M^{th}$ data position is selected from each block of a $1^{st}$ block through an $N^{th}$ block of the frame A 610, and the selected data is arranged in the order of the blocks. In more detail, a data group 730 $AS_1$ in which data of the $1^{st}$ data position of each block is arranged, a data group 740 $AS_2$ in which data of the $2^{nd}$ data position of each block is arranged, a data group 750 $AS_3$ in which data of the $3^{rd}$ data position of each block is arranged, and a data group 760 $AS_M$ in which data of the $M^{th}$ data position is arranged are stored in the buffer 720.

The data groups 730 $AS_1$ through 760 $AS_M$ are inserted into the transmission frames stored in the buffer 720 according to a hierarchical structure. The transmitting unit 120 may transmit the data groups 730 $AS_1$ through 760 $AS_M$ included in the transmission frames according to a transmission order based on the priority of the hierarchical structure. The data groups 730 $AS_1$ through 760 $AS_M$ classified by layers may correspond to different resolutions, amount of detailed information, etc.

FIG. 8 is a diagram for explaining a method of transmitting a plurality of frames according to an exemplary embodiment of the present invention. Referring to FIG. 8, a transmission frame generating unit 800 may receive the frames 600, realign data of the frames 600 based on layers by using a demultiplexer 810, generate transmission frames in which the data of the same layer is arranged, and store the generated transmission frames in a buffer 820.

In more detail, data groups by layers, in which data groups of the same data position of each frame are arranged in the order of the original frames 600, are stored in the buffer 820. That is, a data group 830 $AS_1, BS_1, CS_1, \ldots ZS_1$ having a $1^{st}$ data position of each block is stored in the buffer 820 according to the order of A, B, C, . . . Z. A data group 840 $AS_2, BS_2, CS_2, \ldots ZS_2$ having a second data position, a data group 850 $AS_3, BS_3, CS_3, \ldots ZS_3$ having a third data position, and a data group 860 $AS_M, BS_M, CS_M, \ldots ZS_M$ having an $M^{th}$ data position are stored in the buffer 820 in the same manner as the data group 830.

The data groups 830 through 860 of each layer may be simultaneously stored in the buffer 820. The data groups 830 through 860 of each layer may be stored in different spaces of the buffer 820. The data groups 830 through 860 of each layer of each frame may be simultaneously or sequentially stored in a space corresponding to each layer. That is, the data groups $AS_1, AS_2, AS_3, \ldots AS_M$ may be simultaneously or sequentially stored in the respective space and then the data groups $BS_1, BS_2, BS_3, \ldots BS_M$ may be stored in the respective space.

The transmitting unit 120 may collect the data groups of each layer stored in the buffer 820 in a frame unit and transmit the collected data groups. For example, the transmitting unit 120 may transmit the data groups $AS_1, AS_2, AS_3, \ldots AS_M$ and then transmit the data groups $BS_1, BS_2, BS_3, \ldots BS_M$ by the frame. The transmitting unit 120 may transmit the data groups $AS_1, BS_1, CS_1, \ldots ZS_1$ in a layer unit and then transmit the data groups $AS_2, BS_2, CS_2, \ldots ZS_2$ by the layer. Although the frames are transmitted and received in the manner as described above, since data can be classified according to hierarchical structures, data of a layer satisfying a desired condition, such as a resolution or the amount of detailed information, can be demodulated and restored.

FIG. 9 is a diagram for explaining a method of transmitting a plurality of frames according to another exemplary embodiment of the present invention. Referring to FIG. 9, a data transmission apparatus 900 may include a plurality of demultiplexers and buffers corresponding to the frames. The buffers store data realigned according to hierarchical structures of all the frames in order to store transmission frames. In more detail, the data transmission apparatus 900 may include a demultiplexer 910 that realigns data of the frame A 610 according to hierarchical structures, a buffer 920 that stores transmission frames of the frame A 610, a demultiplexer 915 that realigns data of the frame Z 615 according to hierarchical structures, and a buffer 925 that stores transmission frames of the Z frame 615.

In the same manner as the data groups 730 $AS_1$ through 760 $AS_M$, in which the data of the frame A 610 is realigned by the demultiplexer 910, are stored in the buffer 920, a data group 940 $ZS_1$ having a $1^{st}$ data position realigned by the demultiplexer 915, a data group 950 $ZS_2$ having a $2^{nd}$ data position realigned by the demultiplexer 915, a data group 960 $ZS_3$ having a $3^{rd}$ data position realigned by the demultiplexer 915, and a data group 970 $ZS_M$ having a $4^{th}$ data position realigned by the demultiplexer 915 are stored in the buffer 925. The data transmission apparatus 900 transmits the data of the transmission frames of the frame Z 615 stored in the buffer 925 according to the transmission order of the data groups 940 $ZS_1$ through 970 $ZS_M$.

A buffer 930 stores data 770 and 980 aligned according to layers of all the frames of the frames A 610 through Z 615. The transmitting unit 120 may determine the transmission order to collect the data groups of the all the frames of each layer and transmit the collected data groups (e.g., the data groups 730 $AS_1$ and 940 $ZS_1$ are transmitted and then the data groups 740 $AS_2$ and 950 $ZS_2$ are transmitted). The transmitting unit 120 may transmit the data groups of each layer stored in the buffer 930 in units of frames. That is, the transmitting unit 120 may determine the transmission order to transmit data of a frame based on layers and then transmit data of a next frame based on layers (i.e., the data groups 730 $AS_1$ through 760 $AS_M$ are transmitted and then the data groups $BS_1$, $BS_2$, $BS_3$, ... $BS_M$ are transmitted).

Figure 10:
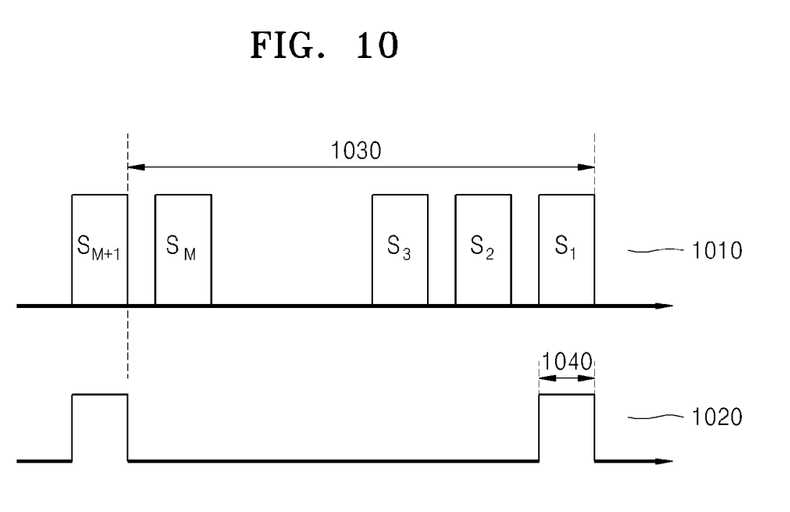
FIG. 10 is a waveform diagram of a demodulation cycle according to an exemplary embodiment of the present invention.

FIG. 10 is a waveform diagram of a demodulation cycle 1040 according to an exemplary embodiment of the present invention. Referring to FIG. 10, the data transmission apparatus 100 may transmit a data service 1010 realigned according to a hierarchical structure including M layers. The data receiving apparatus 200 may receive the data service 1010. For example, data services of layers S1, S2, S3, ... $S_M$ are received during a frame cycle 1030 when a set of frames are transmitted and received.

The demodulation cycle determining unit (not shown) of the data receiving apparatus 200 determines the demodulation cycle 1040 based on the hierarchical structure. The demodulation power controlling unit (not shown) may control a voltage applied to the demodulating unit 220 according to the demodulation cycle 1040 determined by the demodulation cycle determining unit (not shown). That is, the demodulation power controlling unit (not shown) determines a waveform 1020 of the voltage applied to the demodulating unit 220.

The demodulation cycle determining unit (not shown) determines the demodulation cycle 1040 in order to cyclically demodulate a data group of at least one layer. The demodulation cycle determining unit (not shown) may determine the demodulation cycle 1040 in order to demodulate a data service of one of the layers S1, S2, S3, ... $S_M$. Alternatively, the demodulation cycle determining unit (not shown) may adjust the width of the demodulation cycle 1040 to demodulate data services of a plurality of layers.

Therefore, since an extension of the demodulation cycle 1040 increases an amount of demodulated data or detailed information, a data service including a larger amount of information can be restored in a terminal of a receiver, whereas a front-end portion of the receiver increases power consumption. On the contrary, a reduction in the demodulation cycle 1040 reduces power consumption, whereas a data service including a smaller amount of information is restored in the terminal of the receiver. Therefore, since the control of the demodulation cycle 1040 can adjust the resolution or the amount of information of restored data, the demodulation cycle determining unit (not shown) may determine the demodulation cycle 1040 based on a tradeoff between the amount of battery power and accuracy of restored information.

FIG. 11 is a diagram for explaining a data division and transmission method according to an exemplary embodiment of the present invention. Referring to FIG. 11, when a plurality of frames including a frame 0 1120, a frame 1 1130, a frame 2 1140, ... are transmitted, the error correction coding unit (not shown) may perform error correction coding with regard to a data group 1150 B1-0, B1-1, B1-2, ... of a data layer that requires high protection against a transmission error. For example, B1-0 represents a data group B1 of the frame 0 1120. The transmission frame generating unit 110 may perform data realigning 1110 on the data group 1150 that is error correction coded and data groups of the other data layers that are not error correction coded. The transmitting unit 120 may transmit the realigned data groups 1160 in units of frames (0, 1, 2, ... ) 1120.

The data receiving unit 210 receives the realigned data groups 1160 based on the hierarchical structure and according to whether error correction coding is performed. The demodulation cycle determining unit (not shown) determines a demodulation cycle to demodulate a data section 1180 of a layer for which error correction coding is performed. The demodulation power controlling unit (not shown) may control a waveform 1170 of a voltage applied to the demodulating unit 220 according to the determined demodulation cycle. The error correction coding decrypting unit (not shown) may decrypt the error correction coded and demodulated data and restore a data service.

For example, error correction coding is performed in order to protect data groups of data and layers, necessary for restoring the data service against the transmission error. If data layers E1, E2, E3, ... EN used to reinforce detailed information is demodulated, although quality of a restored data service can be improved, since the demodulated data layers E1, E2, E3, ... EN are not necessary for restoring the data service, data that is not error correction coded may be transmitted and received. Therefore, the demodulation cycle determining unit (not shown) may determine the demodulation cycle to demodulate error correction coded data based on tolerance of the data against the transmission error that may occur during data service communication.

Error correction coding may be performed with regard to data of all layers in which a lower level of error correction coding is performed with regard to a data group of a layer corresponding to relatively unimportant detailed information, whereas a higher level of error correction coding may be performed with regard to the data group 1150 that requires the most protection against the transmission error. Therefore, the demodulation cycle determining unit (not shown) may determine the demodulation cycle based on the level of error correction coding, the hierarchical structure, etc.

The data receiving apparatus 200 may demodulate all pieces of data received by the data receiving unit 210 by using the demodulating unit 220, obtains an average value of each piece of data corresponding to at least one layer of each block (section), and allocates the average value to each block of each frame, so that the output frame generating unit 230 generates output frames having a lower resolution and a lower signal to noise ratio (SNR) than the original frames. Therefore, in the previous exemplary embodiments, data having information suitable for a device of various resolutions can be selectively restored with less power consumption.

Figure 12:
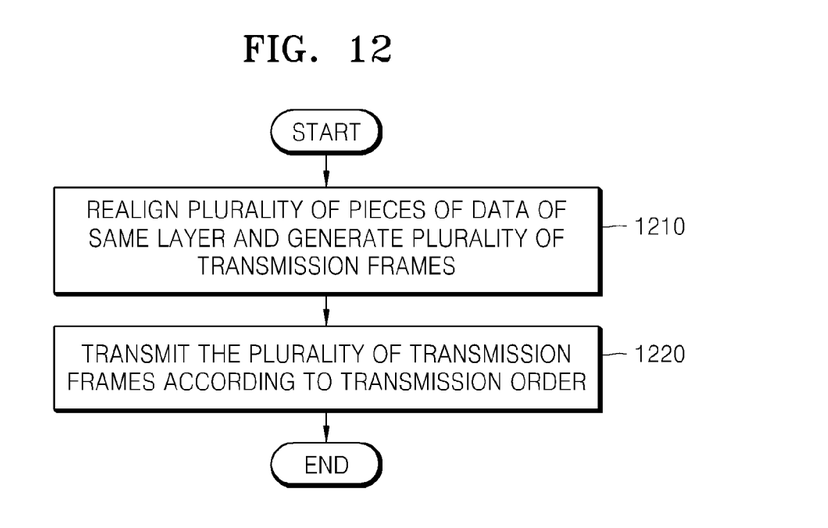
FIG. 12 is a flowchart illustrating a data transmission method according to an exemplary embodiment of the present invention.

FIG. 12 is a flowchart illustrating a data transmission method according to an exemplary embodiment of the present invention. Referring to FIG. 12, in operation 1210, data of the same layer among data of original frames classified in a hierarchical structure based on a resolution are realigned to generate transmission frames. The hierarchical structure may be determined based on a range including data indicating detailed information, as well as the resolution. The data of the original frames may be divided into sub-sections. A predetermined position of data in a sub-section or a range of a data set may correspond to a layer.

If the data includes an image frame, data of the same data position in a block is the data of the same layer. A data group of each layer includes data of the same data position in each block. A transmission frame is generated in which the data group of each layer is arranged according to the priority of layers included in the hierarchical structure.

In operation 1220, a plurality of transmission frames corresponding to the original frames are transmitted according to the transmission order based on the hierarchical structure. The transmission order may be determined based on the hierarchical structure, for example, the data group of each layer of a predetermined frame is continuously transmitted according to the hierarchical structure and a data group of each layer of a next frame is continuously transmitted, or data of all frames of a predetermined layer is continuously transmitted and a data group of a next layer is transmitted.

Figure 13:
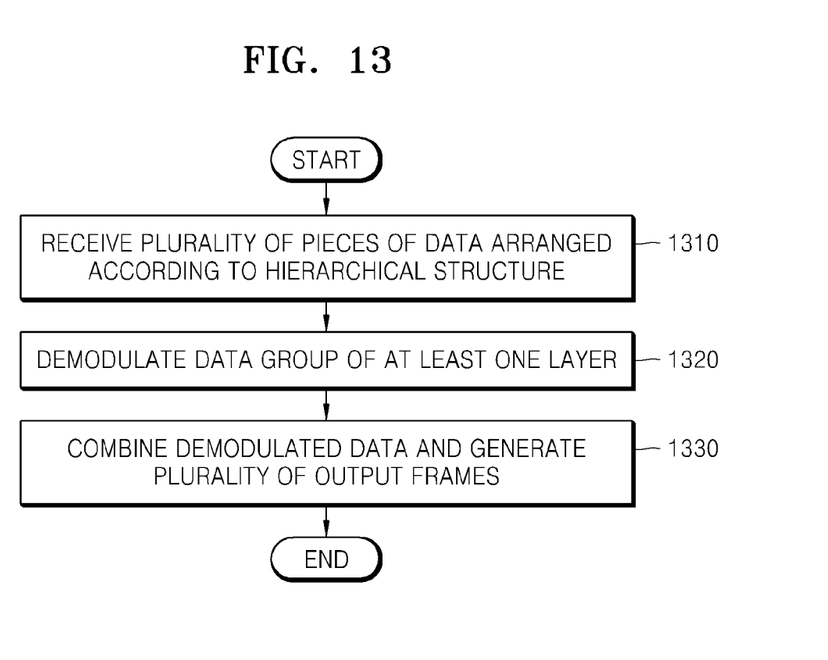
FIG. 13 is a flowchart illustrating a data reception method according to an exemplary embodiment of the present invention.

FIG. 13 is a flowchart illustrating a data reception method according to an exemplary embodiment of the present invention. Referring to FIG. 13, in operation 1310, data arranged by time slicing according to a hierarchical structure based on a resolution is received. The hierarchical structure may be defined according to the amount of information to be restored, as well as the resolution.

In operation 1320, a data group of at least one layer among the received data is demodulated. Since the data groups of a data section of a layer where the amount of information desired by a receiver can be restored is demodulated, power consumption of the receiver may be reduced. A demodulation cycle may be determined so that the data of at least one layer is demodulated based on the compensation relationship between the power consumption and accuracy of service restoration.

In operation 1330, the demodulated data is combined to generate output frames. Data of the demodulated layers is inserted into each section (e.g. block) of each output frame so that a data service having a predetermined resolution or including a predetermined amount of data can be restored.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A transmission method of a plurality of original image frames, each of the plurality original image frames being divided into a plurality of sections, and each of the plurality of sections being divided into a plurality of data of a hierarchical structure of layers, the method comprising:
for each of the plurality of original image frames, generating a plurality of transmission image frames by realigning a plurality of pieces of data of a same layer among data of the original image frame, wherein the data of the original image frame is classified in the hierarchical structure of layers based on an image resolution that is classified according to a capacity representing detailed information;
determining a transmission order of the transmission image frames as one of a first transmission order to continuously transmit a plurality of data groups of each transmission image frame according to an order of the plurality of transmission image frames in a frame unit, each of the plurality of data groups corresponding to a different layer, and a second transmission order to continuously transmit a plurality of data groups of each layer of the plurality of transmission image frames according to a priority of layers of the hierarchical structure in a layer unit; and
transmitting the plurality of transmission image frames according to the determined transmission order.

2. The method of claim 1, wherein the generating the plurality of transmission image frames comprises:
for each of the plurality of original image frames, generating the plurality of data groups, each of the plurality of data groups including a same data position in each of the plurality of sections among data of the original image frame; and
generating the plurality of transmission image frames in which the plurality of data groups having the same data positions in each of the plurality of sections are arranged according to an order of the data positions in each of the plurality of sections,
wherein the same data position in each section corresponds to the same layer according to a hierarchical structure.

3. The method of claim 2, further comprising performing error correction coding with regard to at least one data group of at least one layer of the plurality of original image frames.

4. The method of claim 3, wherein the transmitting the plurality of transmission image frames comprises:
determining the transmission order based on the hierarchical structure and whether the error correction coding is performed.

5. The method of claim 4, wherein the performing of the error correction coding comprises adjusting a level of the error correction coding according to the at least one layer.

6. The method of claim 1, wherein the transmitting the plurality of transmission image frames comprises:
transmitting the plurality of transmission image frames according to the first transmission order and then transmitting the plurality of transmission image frames according to the second transmission order.

7. The method of claim 1, wherein the transmitting the plurality of transmission image frames comprises:
transmitting the plurality of transmission image frames according to the second transmission order and then transmitting the plurality of transmission image frames according to the first transmission order.

8. A reception method of a plurality of original image frames, each of the plurality original image frames being divided into a plurality of sections, and each of the plurality of sections being divided into a plurality of data of a hierarchical structure of layers, the method comprising:
continuously receiving a plurality of data groups of each transmission image frame corresponding to a different layer in a frame unit, or continuously receiving a plurality of data groups of each layer of the plurality of transmission image frames according to a priority of layers of the hierarchical structure in a layer unit, wherein a plurality of data of the data groups are arranged by time slicing according to a hierarchical structure of layers based on an image resolution that is classified according to a capacity representing detailed information;
determining a demodulation cycle corresponding to at least one layer among data of the plurality of original image frames based on the hierarchical structure of layers;

demodulating data of the data group of at least one layer according to the determined demodulation cycle; and generating a plurality of output image frames by combining the demodulated data, 9. The method of claim 8, wherein the determining the demodulation cycle comprises:

determining the demodulation cycle as a part of a frame cycle in which the data group of the at least one layer is received, wherein the frame cycle is a cycle where one image frame is received, and a plurality of image frames are cyclically received according to an order of the plurality of image frames.

10. The method of claim 8, wherein the determining the demodulation cycle comprises determining the demodulation cycle as a period in which a data group of at least one layer corresponding to a predetermined image resolution is received.

11. The method of claim 8, wherein the generating the plurality of output image frames comprises:

determining a plurality of data positions in the plurality of sections corresponding to the layers of the hierarchical structure; and arranging a plurality of data groups of each layer of the hierarchical structure, each of the plurality of data groups including a same data positions in each of the plurality of sections of the plurality of output image frames.

12. The method of claim 11, wherein each of the plurality of output image frames includes a same number of pieces of data as a number of the demodulated layers.

13. The method of claim 8, further comprising decrypting error correction coding performed with regard to at least one data group of at least one layer among the demodulated data.

14. The method of claim 13, wherein the demodulating the data group of the at least one layer comprises determining the demodulation cycle of the data based on the hierarchical structure and whether the error correction coding is performed.

15. The method of claim 13, wherein the decrypting the error correction coding comprises adjusting a level of error correction coding according to the at least one layer.

16. A transmission apparatus of a plurality of original image frames, each of the plurality original image frames being divided into a plurality of sections, and each of the plurality of sections being divided into a plurality of data of hierarchical structure of layers, the apparatus comprising:

a transmission frame generating unit which generates a plurality of transmission image frames by realigning a plurality of pieces of data of a same layer among data of the original image frame, wherein the data of the original image frame is classified in the hierarchical structure of layers based on an image resolution that is classified according to a capacity representing detailed information; and a transmitting unit which determines a transmission order of the plurality of the transmission image frames as one of a first transmission order to continuously transmit a plurality of data groups of each transmission image frame according to an order of the plurality of transmission image frames in a frame unit, each of the plurality of data groups corresponding to a different layer, and determines a second transmission order to continuously transmit a plurality of data groups of each layer of the plurality of transmission image frames according to a priority of layers of the hierarchical structure in a layer unit, and transmits the plurality of transmission image frames according to the determined transmission order.

17. The apparatus of claim 16, further comprising an error correction coding unit which performs error correction coding with regard to at least one data group of at least one layer of the plurality of original image frames.

18. A reception apparatus of a plurality of original image frames, each of the plurality original image frames being divided into a plurality of sections, and each of the plurality of sections being divided into a plurality of data of a hierarchical structure of layers, the apparatus comprising:

a data receiving unit which continuously receives a plurality of data groups of each transmission image frame corresponding to a different layer in a frame unit, or continuously receives a plurality of data groups of each layer of the plurality of transmission image frames according to a priority of layers of the hierarchical structure in a layer unit, wherein a plurality of data of the data groups are arranged by time slicing according to a hierarchical structure of layers based on an image resolution that is classified according to a capacity representing detailed information;

a demodulating unit which determines a demodulation cycle corresponding to at least one layer among data of the plurality of original image frames based on the hierarchical structure of layers and demodulates data of the data group of at least one layer according to the determined demodulation cycle; and an output frame generating unit which generates a plurality of output image frames by combining the demodulated data, 19. The apparatus of claim 18, further comprising an error correction coding decrypting unit which decrypts error correction coding performed with regard to at least data group of at least one layer among the demodulated data.

20. The apparatus of claim 18, further comprising:

a demodulation power controlling unit which controls a voltage of the demodulating unit according to the demodulation cycle of the received data;

a demultiplexer which arranges data according to the hierarchical structure based on an order of the plurality of output image frames and layers of the data to generate the plurality of output image frames; and a buffer which stores the plurality of output image frames.

21. A non-transitory computer readable recording medium having recorded thereon a program for executing the method of claim 1.

22. A non-transitory computer readable recording medium having recorded thereon a program for executing the method of claim 8.

* * * * *